S. S. PUTNAM.
Cattle Stall.
No. 69,022.
Patented Sept. 17, 1867.
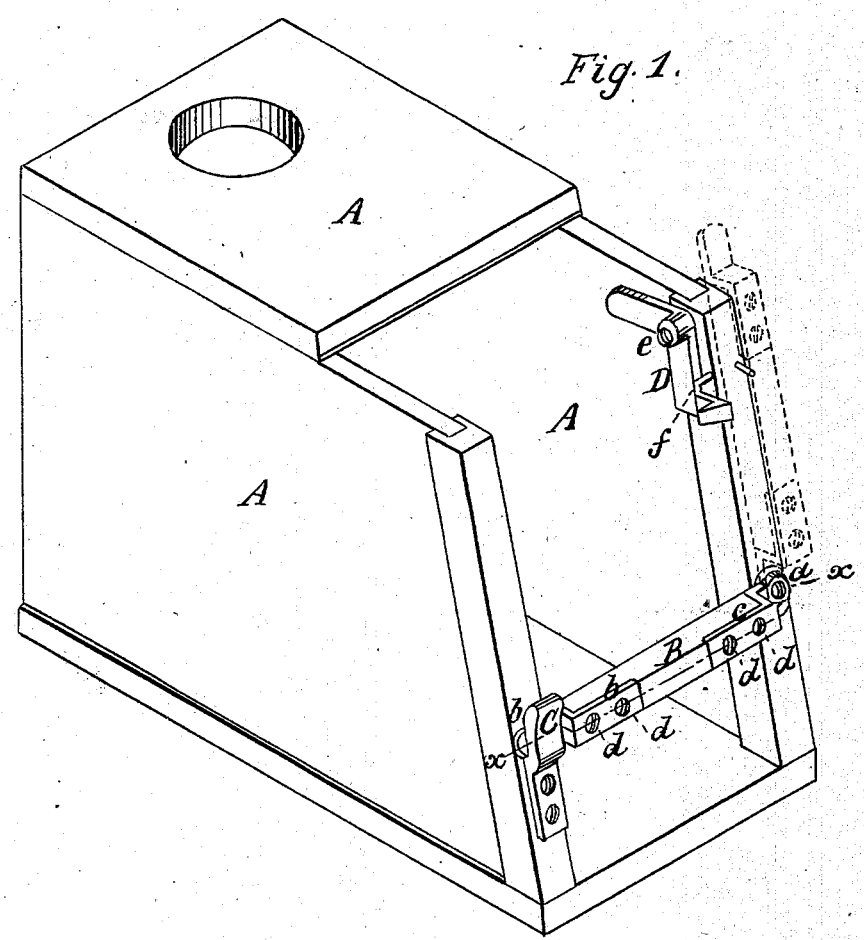
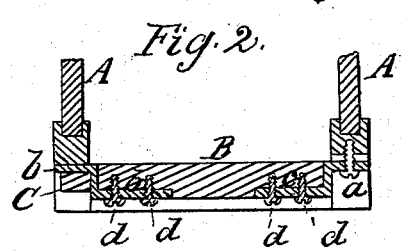

United States Patent Office.

SILAS S. PUTNAM, OF DORCHESTER, MASSACHUSETTS.

Letters Patent No. 69,022, dated September 17, 1867.

IMPROVEMENT IN STALLS FOR ANIMALS.

The Schedule referred to in these Letters Patent and making part of the same.

TO ALL WHOM IT MAY CONCERN:

Be it known that I, SILAS S. PUTNAM, of Dorchester, in the county of Norfolk, and State of Massachusetts, have invented certain improvements in Stalls for Animals, of which the following is a full, clear, and exact description, reference being had to the accompanying drawings, making part of this specification, in which—

Figure 1 is a perspective view of a horse-stall with my improvements applied thereto.

Figure 2 is a horizontal section on the line $x\ x$ of fig. 1.

Stalls for horses and other animals are usually provided with a chain or rope which is extended across the rear end, and hooked or otherwise fastened, so as to prevent the escape of the animal in case he should get loose within the stall. When the animal is lying down, however, he frequently gets into a position beneath the chain or rope, so that in rising his back will be liable to come into contact with it, and many horses have broken their backs or otherwise seriously injured themselves from this cause.

To overcome this difficulty is the object of my invention, which consists in providing the stall with a bar or device which extends across its rear end, and is so constructed and applied that it will yield in an upward direction in case the back of the animal should come into contact with it, and will drop into place on the animal stepping forward, so as to prevent his escape, thus avoiding all liability of injury or accident.

To enable others skilled in the art to understand and use my invention, I will proceed to describe the manner in which I have carried it out.

In the said drawings, A represents the stall, to one side of which, at the rear end, is pivoted at $a$, a bar, B, which is formed of wood, and provided at its ends with metallic pieces $b\ c$, of the form seen in fig. 2, which are secured in place by means of screws $d$. The bar, however, may be made of a single piece of wood or other suitable material, if preferred. When this bar is in a horizontal position, as seen in fig. 1, its end $b$ fits into a catch, C, projecting from the side of the stall, which thus holds it securely in place, and prevents it from being forced outward, and when it is desired to take the animal out of the stall, the bar B may be swung up into the position seen in red in fig. 1, where it is held by a catch, D, which is pivoted at $e$ to the side of the stall, and held in the required position by a pin, $f$. Any other suitable device may, however, be employed instead of the catch D, or the catch may be dispensed with entirely, if preferred. It will thus be seen that in case the animal occupying the stall should get into a position beneath the bar B, and should attempt to rise suddenly, his back would come into contact with the bar, which would yield and swing up on its pivot $a$, and as soon as the animal moves forward into the stall, the bar B will fall by its own gravity into a horizontal position, as seen in fig. 1, preventing his escape, as required, and all liability is thus avoided of his injuring himself, as would be the case where a rope or chain is stretched across the stall as heretofore.

*Claim.*

What I claim as my invention, and desire to secure by Letters Patent, is—

The bar B or its equivalent, in combination with the stall A, the bar being so constructed and applied that it will yield in an upward direction, and drop to its original position when released, substantially as and for the purpose described.

SILAS S. PUTNAM.

Witnesses:
P. E. TESCHEMACHER,
N. W. STEARNS.